(12) United States Patent
Dross et al.

(10) Patent No.: US 10,437,030 B2
(45) Date of Patent: Oct. 8, 2019

(54) COLLIMATOR AND COLLIMATOR ARRANGEMENT

(71) Applicant: SIGNIFY HOLDING B.V., Eindhoven (NL)

(72) Inventors: Oliver Dross, Eindhoven (NL); Michel Cornelis Josephus Marie Vissenberg, Eindhoven (NL); Johannes Petrus Maria Ansems, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/069,118

(22) PCT Filed: Jan. 17, 2017

(86) PCT No.: PCT/EP2017/050855
§ 371 (c)(1),
(2) Date: Jul. 10, 2018

(87) PCT Pub. No.: WO2017/125370
PCT Pub. Date: Jul. 27, 2017

(65) Prior Publication Data
US 2019/0003685 A1    Jan. 3, 2019

(30) Foreign Application Priority Data

Jan. 21, 2016 (EP) ..................................... 16152162

(51) Int. Cl.
*G02B 17/00* (2006.01)
*F21V 5/00* (2018.01)
(Continued)

(52) U.S. Cl.
CPC ............ *G02B 17/002* (2013.01); *F21V 5/007* (2013.01); *F21V 5/04* (2013.01); *F21V 7/0091* (2013.01);
(Continued)

(58) Field of Classification Search
CPC .......... F21V 5/04; F21V 5/007; F21V 7/0091; G02B 19/0028; G02B 19/0061;
(Continued)

(56) References Cited

U.S. PATENT DOCUMENTS 6,373,633 B1 *  4/2002  Brown ............... B23K 26/0604
                                                                359/618
6,739,738 B1    5/2004  Smith
(Continued)

FOREIGN PATENT DOCUMENTS

GB    2365962 A    2/2002
JP    2006048165 A    2/2006
(Continued)

*Primary Examiner* — Erin Kryukova
(74) *Attorney, Agent, or Firm* — Daniel J. Piotrowski (57) ABSTRACT

The invention provides various designs for enabling a non-circular area of collimated light output or to enable tessellation of collimators. In a first aspect, a collimator arrangement comprises a plurality of collimators, each having a circular general outer shape with one or more indentation into the circular general outer shape, wherein each indentation comprises a pair of edges which meet at an internal angle and each indentation defines a pair of external angles where the cut-out meets the general outer shape. The collimators are tessellated with each internal angle adjacent one of the external angles of an adjacent collimator. In another aspect, a collimating optical structure comprises a first section comprising one or more portions of a first collimator lens design with a first diameter and a second section comprising one or more portions of a second collimator lens design with a larger, second diameter. The portions comprise sectors which together form an annular shape around the optical axis with non-constant radius from the optical axis.

7 Claims, 9 Drawing Sheets

(51) Int. Cl.
  *G02B 27/09* (2006.01)
  *G02B 27/30* (2006.01)
  *G02B 19/00* (2006.01)
  *F21V 5/04* (2006.01)
  *F21V 7/00* (2006.01)
  *F21V 13/04* (2006.01)

(52) U.S. Cl.
  CPC .......... *F21V 13/04* (2013.01); *G02B 19/0028* (2013.01); *G02B 19/0061* (2013.01); *G02B 19/0066* (2013.01); *G02B 27/0961* (2013.01); *G02B 27/30* (2013.01)

(58) Field of Classification Search
  CPC ............ G02B 19/0066; G02B 27/0961; G02B 27/30; G02B 17/002
  See application file for complete search history.

(56) References Cited

U.S. PATENT DOCUMENTS

| | | | | |
|---|---|---|---|---|
| 6,859,326 | B2* | 2/2005 | Sales | G02B 3/0043 359/619 |
| 7,547,115 | B2 | 6/2009 | Chou | |
| 9,250,417 | B2* | 2/2016 | Schaffer | G02B 7/182 |
| 2002/0024822 | A1* | 2/2002 | Pond | B60Q 1/2607 362/555 |
| 2006/0044806 | A1 | 3/2006 | Abramov et al. | |
| 2006/0291206 | A1* | 12/2006 | Angelini | F21V 5/04 362/244 |
| 2011/0063836 | A1* | 3/2011 | Salm | F21V 5/007 362/235 |
| 2011/0063856 | A1 | 3/2011 | Mintz et al. | |
| 2011/0211337 | A1* | 9/2011 | Ito | G02B 19/0028 362/97.1 |
| 2012/0051049 | A1 | 3/2012 | Huang | |
| 2012/0087118 | A1* | 4/2012 | Bailey | F21V 31/005 362/235 |
| 2012/0121226 | A1* | 5/2012 | Fleischman | G02B 6/02 385/123 |
| 2012/0268949 | A1 | 10/2012 | Parkyn | |
| 2012/0287511 | A1* | 11/2012 | Dross | F21V 5/04 359/641 |
| 2013/0033866 | A1* | 2/2013 | Lai | H01L 33/54 362/235 |
| 2013/0176727 | A1 | 7/2013 | Desmet et al. | |
| 2015/0285442 | A1 | 10/2015 | Smith | |
| 2016/0341395 | A1* | 11/2016 | Kiyota | G02B 19/0057 |

FOREIGN PATENT DOCUMENTS

| | | |
|---|---|---|
| WO | WO2004066002 A1 | 8/2004 |
| WO | WO2007016363 A2 | 2/2007 |

* cited by examiner

COLLIMATOR AND COLLIMATOR ARRANGEMENT

CROSS-REFERENCE TO PRIOR APPLICATIONS

This application is the U.S. National Phase application under 35 U.S.C. § 371 of International Application No. PCT/EP2017/050855, filed on Jan. 17, 2017, which claims the benefit of European Patent Application No. 16152162.0, filed on Jan. 21, 2016. These applications are hereby incorporated by reference herein.

FIELD OF THE INVENTION

This invention relates to lighting arrangements, and in particular lighting arrangements which make use of one or more collimators.

BACKGROUND OF THE INVENTION

Collimators, for example collimators used for light emitting diode (LED) applications, are usually round. When several LEDS are required, a plurality of round collimators are typically provided and arranged in an array, known as a "shower head" array. The shape of the collimators means that the array includes unlit areas as a consequence of the lack of tessellation of the round collimators.

Instead of several LEDs, a single light source (e.g. a chip on board (COB) LED) can be used with a single collimator. However, providing a COB LED is more expensive than providing a number of separated LEDs, and the optics for a single combined light source takes up a greater depth than an array of small collimators. In many LED devices, the depth required by a COB LED is unavailable since other parts of the device, such as the heat sink and driver, take up a significant proportion of the available space.

Figure 1:
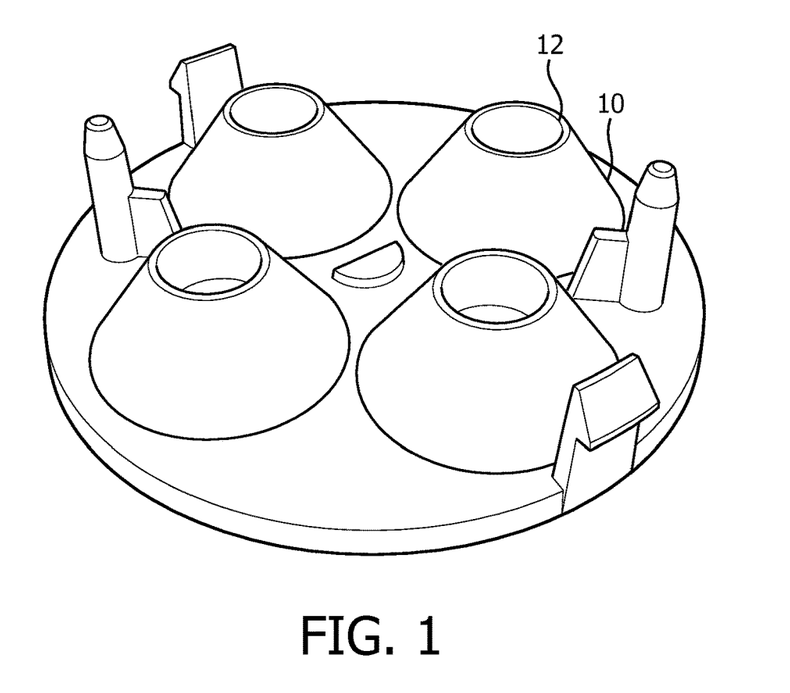
FIG. 1 shows a first known arrangement of multiple collimators.

FIG. 1 shows a typical array of four collimators 10 from the underside. The collimators for example comprise total internal reflection lenses, and each has an entrance opening 12 into which light is provided by an associated LED.

Figure 2:
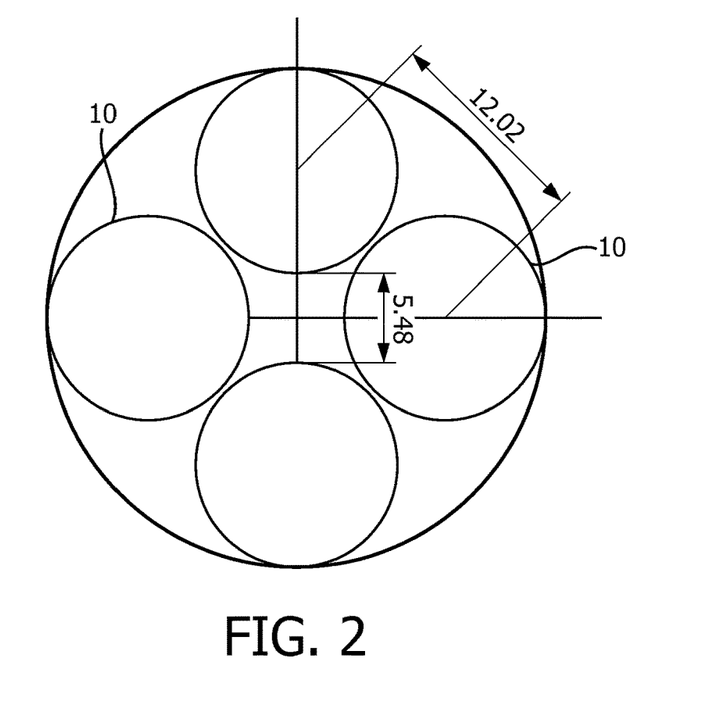
FIG. 2 shows the light output regions for the arrangement of FIG. 1.

FIG. 2 shows that the four collimators are as close together as possible, but only the circular areas 10 are illuminated. The remaining space remains unlit.

A known approach to address this problem is to move the collimators closer to each other, so that they start cutting into each other. In this way, the unlit area between collimators is reduced, but not eliminated. Further, by providing overlapping collimators some light from the LED is not collimated. Usually, light that is not captured by the removed section of the total internal reflection surface will be at least partially lost which leads to a sharp efficiency drop.

There is therefore a need to provide an improved way to collimate light produced by an arrangement including multiple LEDs, or to provide an efficient way to generate a non-circular collimated light output.

SUMMARY OF THE INVENTION

The invention is defined by the claims.

According to examples in accordance with a first aspect of the invention, there is provided a collimator comprising:
a light entrance opening having an optical axis;
a collimating optical structure disposed around the optical axis, wherein the collimating optical structure comprises at least two sections:
a first section comprising one or more sectors of a first collimator lens design with a first diameter; and
a second section comprising one or more sectors of a second collimator lens design with a larger, second diameter,
wherein the sectors together form an annular shape around the optical axis with non-constant radius from the optical axis.

This design makes use of (at least) two different collimator designs, of different diameter. By combining different sectors made to the different designs, the outer shape can be made to tessellate better by having small diameter parts and large diameter parts.

The portions are in contact with each other by their respective side walls so that there are no gaps.

The outer shape of the collimator may have a polygonal shape, and the second section comprises a sector at each corner of the polygon. The second section may for example comprise four portions for a square or rectangular overall design. The four portions are then at each corner, so that the outer shape becomes closer to a square or rectangle, to enable better tessellation, or else simply to enable a single collimator to match better a product design for which a square light output window is desired. Examples in accordance with a second aspect of the invention provide a collimator arrangement comprising a plurality of collimators, each collimator at the periphery of the collimator arrangement having in a respective exit window a circular general outer shape with one or more cut-outs into the circular general outer shape, wherein each cut-out comprises a pair of edges which meet at an internal angle and each cut-out defines a pair of external angles where the cut-out meets the general outer shape, wherein each collimator having one or more cut-outs is interlocked by said cut-outs to form a tessellation with the internal angle adjacent one of the external angles of an adjacent collimator.

By providing an arrangement of collimators which include cut-outs, it becomes possible to tessellate the shapes. The cut-outs interlock in a central part of the overall area, whereas the outer shape of the collimator arrangement may be defined by the generally circular parts of the individual collimator designs. In this way, it has been found that the cut-outs do not give rise to square artifacts in a rotationally symmetric beam. The arrangement may have four or more collimators. In some designs, all of the individual collimator designs may be the same, and in other designs different designs may be used to enable a tessellation.

The general circular outer shape is interrupted by the cut-outs. Note that the term cut-out is not intended to imply that material is removed to form the collimator shape—it may in practice be molded in its final shape. The term is intended to convey the difference compared to a circular shape. The cut-outs mean that the outer shape has a set of one or more circular arc portions interrupted by indentations. These indentations comprise a pair of inwardly directed radial faces. With one cut-out, there is one circular arc portion and a single indent. Each additional cut-out adds an extra arc portion. The arc portions are part of a single common rotationally symmetric design.

The collimator for example is designed to produces, in combination with the light source, a light output with full wave half maximum (FWHM) of less than 60 degrees.

Each collimator may comprise a center part at a light source input and a reflector part, wherein the cut-outs are formed in the reflector part.

Each cut-out preferably defines an internal angle of 80 to 100 degrees, and most preferably 90 degrees. This means the cut-outs may be interlocked to form a tessellation.

Each collimator may comprise a total internal reflection collimator. Alternatively, each collimator may comprise a central part for directly light radially outwardly and a radially outer reflector part, wherein the cut-outs comprises specular reflecting side walls.

Each collimator preferably has an entrance opening for receiving light from a respective light source, wherein the entrance opening has a portion for directing light away from the cut-out region of the collimator. In this way, light is preferentially directed to the undistorted collimator shape. The portions may comprise indentations in the entrance opening.

There are various different possible configurations.

In a first example, there are four collimators each with a single cut-out and one collimator with four cut-outs. In this design, there is a central cross with arms which project into the single cut-out of four surrounding collimators.

In a second example, there are four collimators each with two cut-outs. This means a single design of individual collimator may be used to create a larger overall collimator for four light sources.

In a third example, there are two collimators each with four cut-outs, four collimators each with two cut-outs and two collimators each with one cut-out. This provides a larger generally circular overall arrangement for 8 light sources.

In a fourth example, there are four collimators, each with four cut-outs and eight collimators each with two cut-outs. This provides a larger generally circular overall arrangement for twelve light sources.

These arrangements make use of a single collimator base design, and modify the shape to enable tessellation. An alternative is to modify the base design.

The invention also provides a lighting unit comprising a collimator as defined above and a light source configured to couple light into the light input. This may be used as a single light collimator.

The invention also provides a collimator arrangement comprising a plurality of collimators, each as defined above. The control of the outer shape then enables better tessellation.

The outer shape of each collimator may be a polygon which can be tessellated with other collimators, and the second section comprises a sector at each corner of the polygon. The corner sectors of larger diameter mean the design fills a polygon better, and those polygons may then be tessellated (for example triangles, squares or hexagons).

In one example, the second section of each collimator comprises four sectors within a square or rectangle, wherein the collimators are arranged in a square or rectangular grid array. The overall outer shape may then be generally square or rectangular.

The outer shape of the collimator arrangement may instead be circular or elliptical, wherein each collimator has inner faces which approximate to straight edges (so that they butt together when tessellating the collimators to form the collimator arrangement) and an outer face which approximates to a portion of the circle or ellipse.

The collimator arrangement may in particular have a circular outer shape, and comprises four collimators.

Each collimator may then comprises:
a first section with three sectors;
a second section with two sectors, wherein the two sectors of the second section are between 90 and 105 degrees each side of a radial inward direction.

These four collimators are designed to be formed in a 2×2 grid, but the overall outer shape remains generally circular rather than square.

The sectors of the second section are for example 100 degrees each side of the radial inward direction. This provides an optimum way to fill the gaps in a larger circle formed by the tessellation of four smaller circles.

The invention also provides a lighting unit comprising:
a collimator arrangement as defined above; and
a respective light source configured to couple light into the light input of each collimator of the collimator arrangement.

In all designs, each individual collimator may comprise a third or further sections with different diameters. In this way, the gaps in a desired outer shape are filled even more effectively.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides various designs for enabling a non-circular area of collimated light output or to enable tessellation of collimators. In a first aspect, a collimator arrangement comprises a plurality of collimators, each having a circular general outer shape with one or more indentation into the circular general outer shape, wherein each indentation comprises a pair of edges which meet at an internal angle and each indentation defines a pair of external angles where the cut-out meets the general outer shape. The collimators are tessellated with each internal angle adjacent one of the external angles of an adjacent collimator. In another aspect, a collimating optical structure comprises a first section comprising one or more sectors of a first collimator lens design with a first diameter and a second section comprising one or more sectors of a second collimator lens design with a larger, second diameter. The sectors together form an annular shape around the optical axis with non-constant radius from the optical axis.

This invention relates generally to the outer shape of collimator designs. The invention may make use of any one of many different known collimator types.

FIG. 3 shows a first set of examples of known collimator type making use of total internal reflection. In each case, a light source 30 provides light to an entrance opening 12 around an optical axis direction 13 (shown only in FIG. 3A) to a total internal reflection collimator 32. The light enters a collimating optical body, and undergoes a refractive index angle change. The light then reaches a face of the body where there is an interface to the material outside, typically air, and then undergoes total internal reflection. The light then leaves the body, or it may first undergo a series of total internal reflections. The designs are all rotationally symmetric about the optical axis 13 (i.e. the central axis). As shown, some designs make use of refracting parts where no internal reflection takes place. For example the design of FIG. 3G has a central refracting zone using a toothed design and a lateral total internal reflection (TIR) zone.

Different designs differ in how refraction and reflection are used to implement the desired collimation.

FIG. 4 shows a second set of example of known collimator design making use of specular reflection. In all cases, the light passes to collimator 40 having a refracting optical body which forms a center part 42 of the collimator and there is additional use of radially outer reflector parts 44. These designs for example increase the area of the collimated beam. The light is again provided to an entrance opening 12 around an optical axis direction 13 (shown only in FIG. 4A).

Suitable collimator types thus include TIR lenses, TIR Fresnel lenses, Refractive Fresnel lenses, RXI lenses (which combine refraction (R), reflection (X), and total internal reflection (I)), together with combinations of side emitting lenses with reflectors. In general the collimator has a separate reflector part and center part where the LED and the entrance part of the collimator are situated.

A first aspect of the invention provides modification of the external shape of a collimator to enable tessellation. By "external shape" is meant the outer shape when viewing the collimator along the light output direction, i.e. the output shape of the collimator viewed face on, as in FIG. 2.

Collimators for LED lighting are usually round. For aesthetical reasons or to array several collimators without gaps to create a more uniform appearance, other shaped collimators are desirable. This aspect involves the use of cut-out segments so that collimators may be combined with reduced regions of unlit gaps between them.

Figures 5A, 5B, 5C, 6, 7:
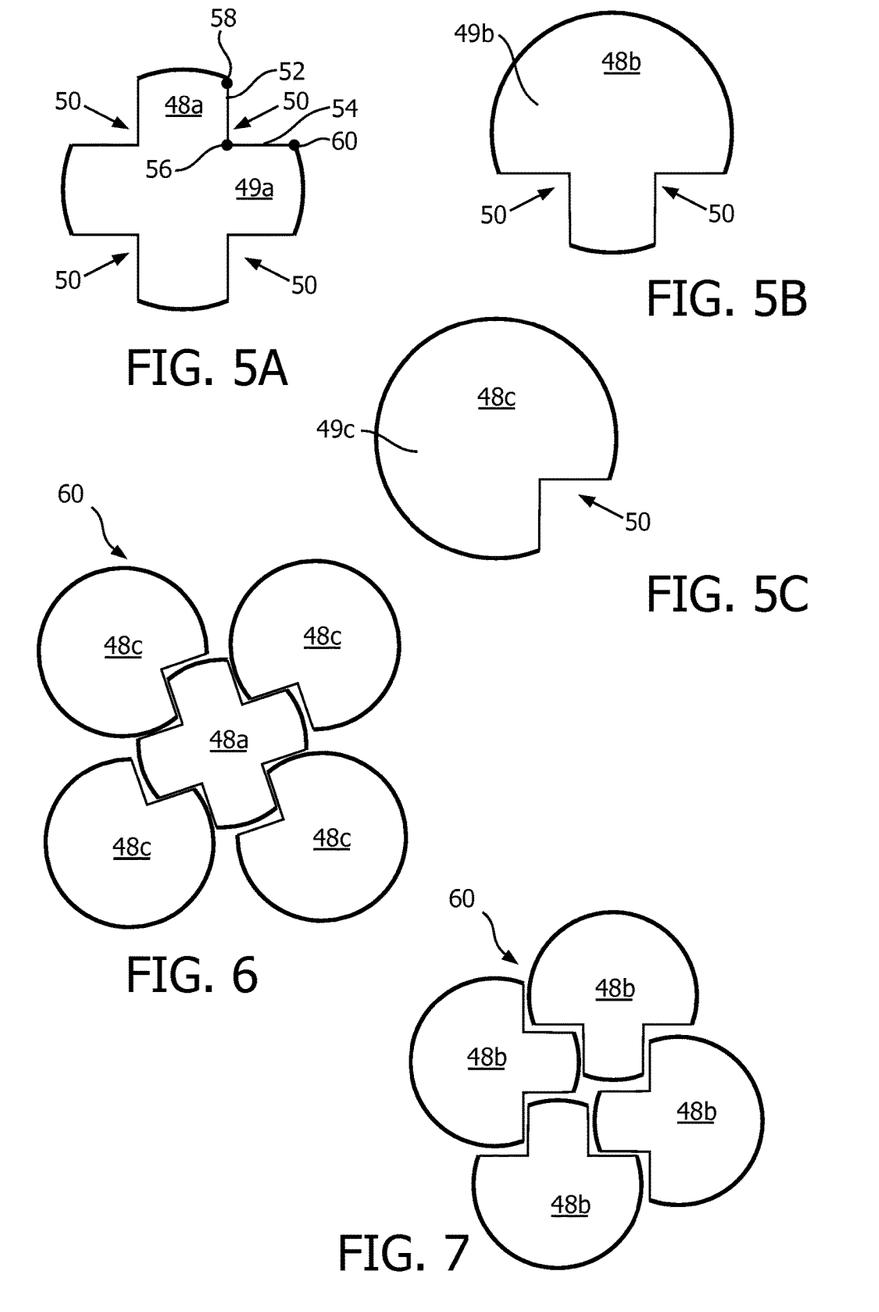
FIG. 5A-C shows a set of collimator design according to a first example.
FIG. 6 shows a first tessellation using collimator designs from FIG. 5.
FIG. 7 shows a second tessellation using collimator designs from FIG. 5.

FIG. 5 shows three different collimator designs 48a, 48b, 48c, for use in a tessellated arrangement of exit windows 49a, 49b, 49c of a plurality of collimators. In each case, the collimators have a circular general outer shape with one or more cut-outs (or indentations or recesses) into the circular general outer shape of the exit window of the collimator.

FIG. 5A shows a design 48a with four cut-outs 50 in exit window 49. Each cut-out comprises a pair of edges 52, 54 which meet at an internal angle 56 and each cut-out defines a pair of external angles 58, 60 where the cut-out 50 meets the general outer shape. The internal angle is preferably 90 degrees so that the shapes may interlock with minimum gap. However, an angle of 80 to 100 degrees is sufficient.

The shapes shown in FIG. 5 are the plan view shape, namely looking face on at the light output face of the collimator. The edges 52, 54 are planar, with the plane into and out of FIG. 5, namely parallel with the general light output direction, i.e. the optical axis of the collimator.

FIG. 5B shows a version 48b with two cut-outs 50 in exit window 49b and FIG. 5C shows a version 48c with one cut-out 50 in exit window 49c. The cut-out extends generally towards the optical axis, and therefore towards the light source light input, but not perfectly radially, since the cut-out does not reach the center, as can be seen in FIG. 5A. The cut-out does not remove part of the central cavity of a total internal reflection collimator, because the collimator would then leak light at the cut-out.

The collimators are designed to be tessellated with each internal angle 56 adjacent one of the external angles 58, 60 of an adjacent collimator. Each collimator for example comprises a total internal reflection collimator. For the examples of FIGS. 3 and 4, the cut-out is limited to the outer reflecting part, not including the central optical part. The design of FIG. 3C and the design of FIG. 4 in particular may be provided with a specular reflector at the edges of the cut-out to keep the light in. For a total internal reflection optical collimator, the cut-out edge automatically reflects via total internal reflection. The cut-out portion is thus for reflector or total internal reflector parts of the collimator design.

Each collimator has an entrance opening for receiving light from a respective light source, although these are not shown in FIG. 5, which is used only to explain the shape details. The entrance opening can be seen in FIG. 1 for example.

FIG. 6 shows a first possible tessellation, using four collimators with one cut-out, as shown in FIG. 5C and one with four cut-outs as shown in FIG. 5A. The general circular outer shape is the same for all of the tessellated collimators. Together, the collimators form a collimator arrangement 60.

As shown in FIG. 6, when tessellated, the cut-outs interlock in a central part of the overall area, whereas the outer shape of the collimator arrangement is defined by the generally circular parts of the individual collimator designs. For the design of FIG. 6, the outer shape is defined only by the collimators with one cut-out, and the collimator with four cut-outs is in the center.

FIG. 7 shows a second possible tessellation to form a collimator arrangement 60 using four collimators all of the same design; the design of FIG. 5B with two cut-outs. For the design of FIG. 7, the outer shape is defined only by the curved outer parts of the four collimators, and the cut-outs are all in the center.

Figure 8:
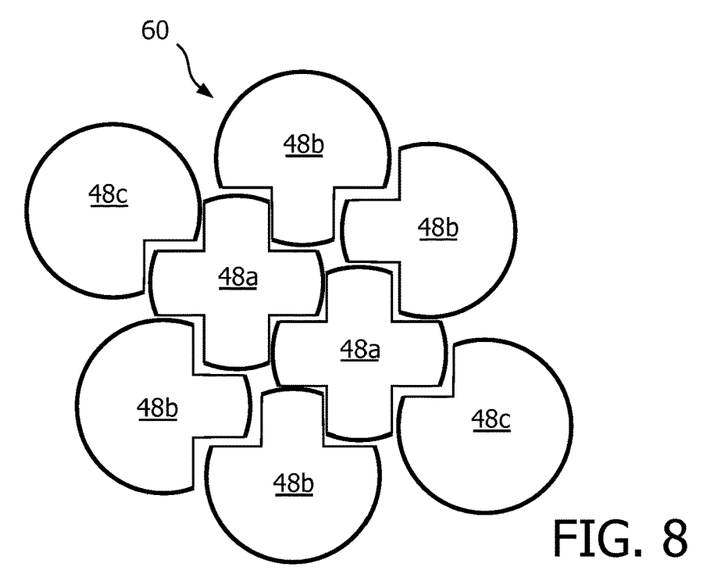
FIG. 8 shows a third tessellation using collimator designs from FIG. 5.

FIG. 8 shows a design for 8 collimators to form a collimator arrangement 60. Two are collimators with four cut-outs as shown in FIG. 5A, four are collimators with two cut-outs as shown in FIG. 5B and two are collimators with one cut-out as shown in FIG. 5B. This provides a larger generally circular overall arrangement for 8 light sources. The overall outer shape is again formed only from curved surfaces.

Figure 9:
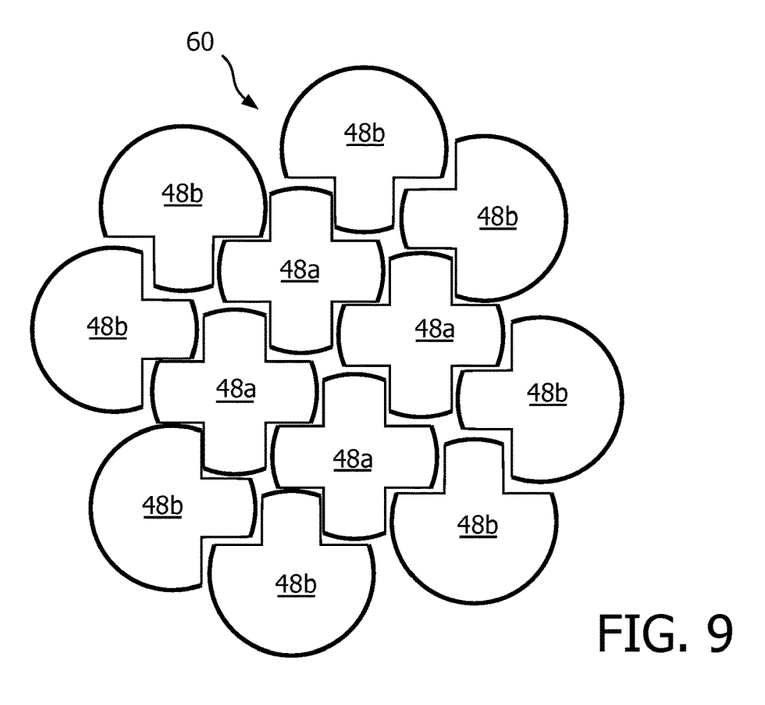
FIG. 9 shows a fourth tessellation using collimator designs from FIG. 5.

FIG. 9 shows a design for twelve collimators to form a collimator arrangement. Four are collimators with four cut-outs as shown in FIG. 5A and eight are collimators with two cut-outs as shown in FIG. 5B. This provides a larger generally circular overall arrangement for twelve light sources.

These designs enable a close-packed array of collimators without gaps. This creates a different look than the known method of making collimators cut into each other.

It has been found that the cut-outs do not give rise to square artifacts in a rotationally symmetric beam. In particular, the design of four collimators shown in FIG. 7 has been simulated using ray-tracing software. Existing MR16 spot collimators were used, and the cut-out was made by a straightforward Boolean subtraction of a rectangular block in the simulation tool.

Figure 10:
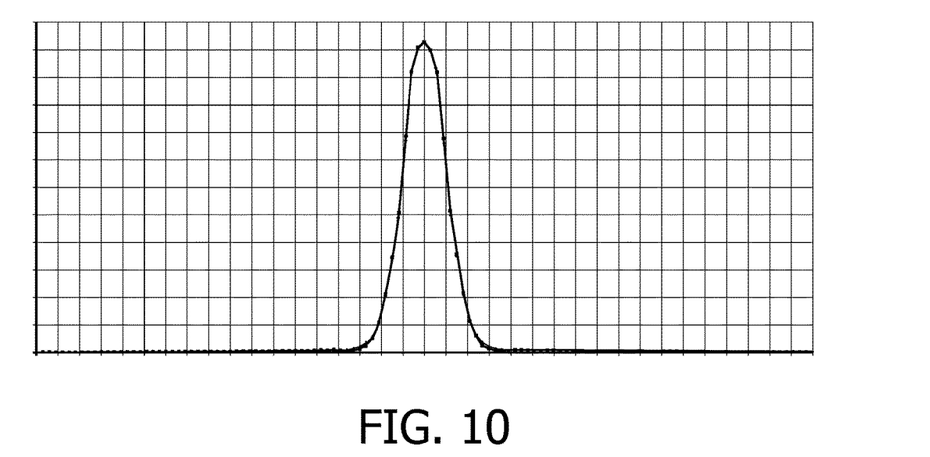
FIG. 10 shows one representation of the light output distribution for the design of FIG. 7.

FIG. 10 shows the intensity versus angle for one cross sectional plane including the optical axis. The distribution is symmetric. Similar intensity slices at various cross-sections show that the intensity distribution is circular symmetric.

Figure 11:
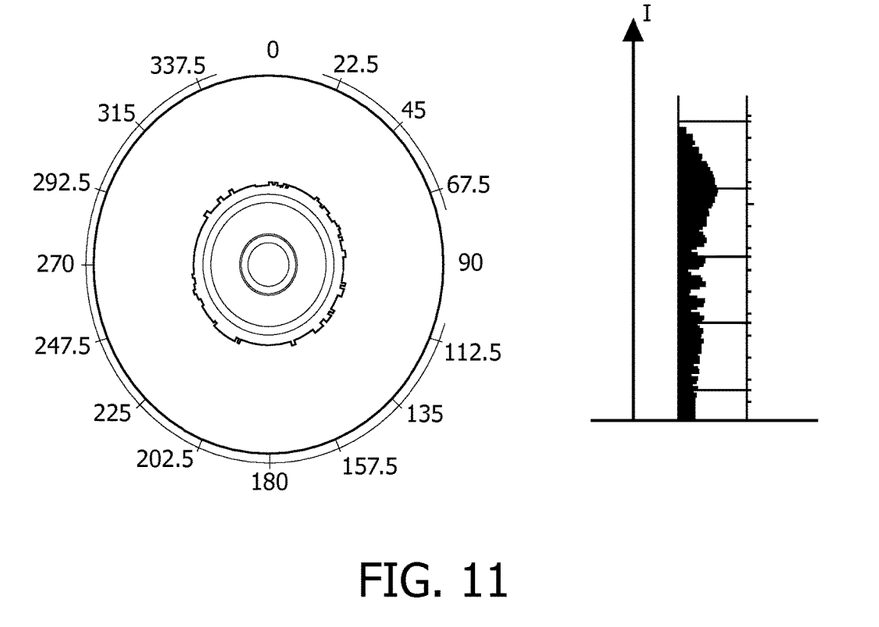
FIG. 11 shows another representation of the light output distribution for the design of FIG. 7.

FIG. 11 shows the intensity as projected onto a surface. The left part shows the intensity as an image, and the right part shows the contribution of different light intensities to the pattern. The rotational symmetry of the output beam is clearly visible.

The peak intensity is reduced by a factor proportional to the loss in the collimator exit window area, which is expected. The original peak intensity may be regained if the area with cut-out is scaled to the original collimator exit area without the cut-out. There is also however undesired scaling of the height by the same factor. Another way to regain the peak intensity is to use more collimators, which is possible because of the improved tessellation of the collimators with cut-out compared to round collimators.

An improvement in efficiency may be obtained found by cutting out right angled slots at the entrance opening of the collimator as well. These serve to direct light preferentially from the light source to the non-cut-out portions of the collimator. These slots function as a portion for directing light away from the cut-out region of the collimator. Other light direction mechanisms may be used to direct light away from the cut-out portions.

Figure 12:
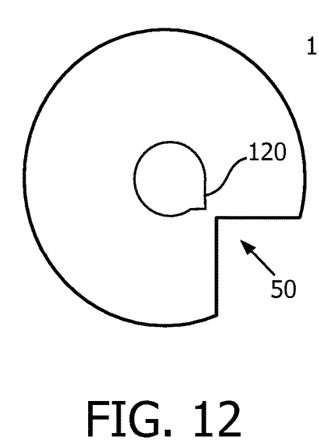
FIG. 12 shows a collimator which has a cut-out with a slot facing the cut-out.

FIG. 12 shows an example in which the collimator has a single cut-out 50, and a slot 120 faces the cut-out. This means that light directed to the cut-out 50 is refracted towards the normal direction of the slot faces, which is away from the cut-out. There may be one such slots for each cut-out, for designs with more than one cut-out.

A second aspect of the invention provides a collimator design comprising a collimating optical structure disposed around an optical axis, wherein the collimating optical structure comprises at least two sections. A first section comprises one or more portions of a first collimator lens design with a first diameter and a second section comprises one or more portions of a second collimator lens design with a larger, second diameter. The portions are different sectors of an annular shape. However, the portions of one section are part of a single rotationally symmetric design. The different sections have different diameter so that an overall shape is non-circular.

Figure 13:
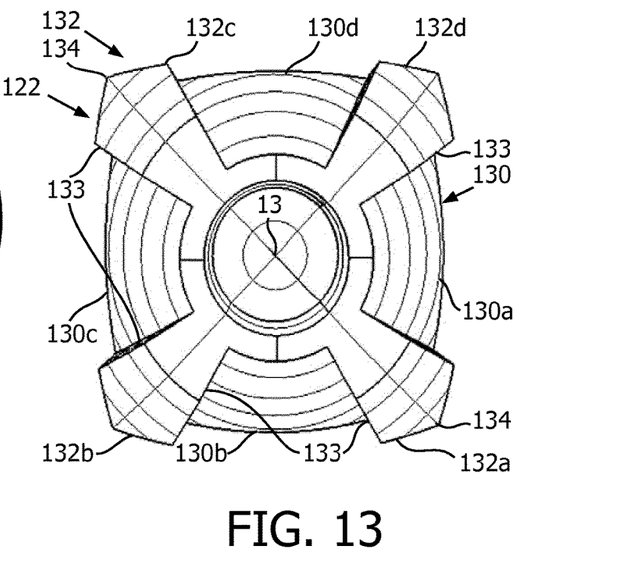
FIG. 13 shows a collimator design according to a second example in plan view.

FIG. 13 shows an example of a collimator 122 viewed from above. Thus, the collimating surface is seen, and the light source is to be positioned beneath the collimator.

A first section 130 comprises four portions 130a to 130d. They are essentially sectors although they do not extend fully to the center as a result of the central opening. A second section 132 comprises four portions 132a to 132d, again in the form of sectors. The second section has a larger diameter. With the four sectors of each section evenly angularly spaced, the result is that there are four extended corner 134 sectors, so that the overall shape approximates a square. The portions are all essentially sectors so that there remains rotational symmetry (of order 4 in this example) and the contribution of each collimator section remains in the same ratio for different radial distances from the center.

The junctions between sectors form side walls 133.

Figure 14:
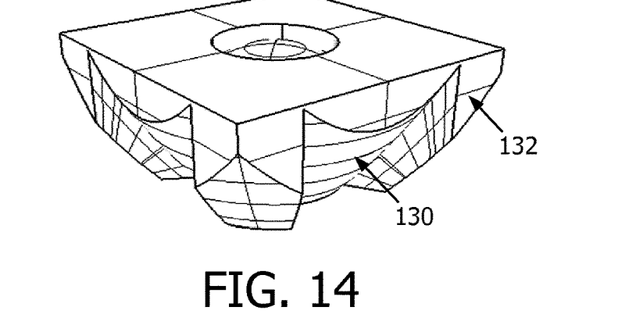
FIG. 14 shows the collimator design of FIG. 13 in perspective view.

A perspective view is shown in FIG. 14.

This design enables better tessellation as a square grid array, or else a single collimator may be used if a square light output window is desired. In particular, the outer shape of the collimator is polygonal (square in the example of FIG. 13), and the second section 132 comprises a sector at each corner 134 of the polygon.

Figure 3A:
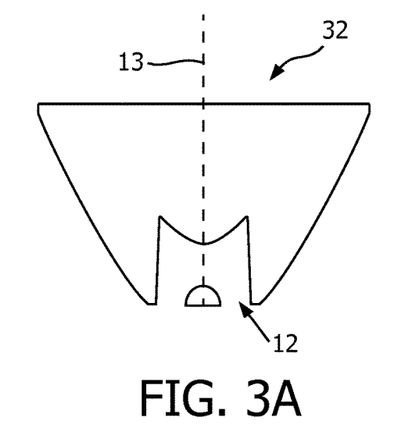
FIG. 3A-G shows a first set of examples of known collimator design making use of total internal reflection.
Figure 3B:
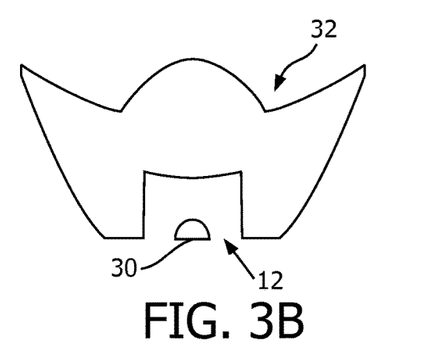
Figure 3C:
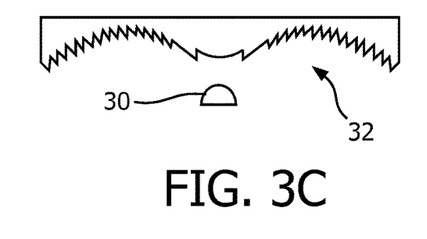
Figure 3D:
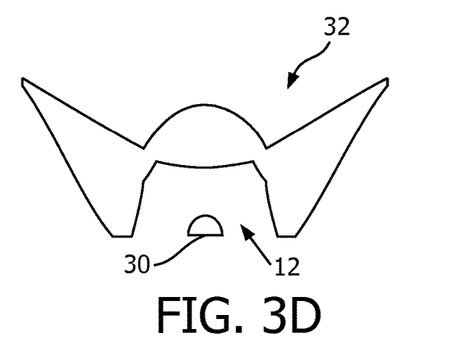
Figure 3E:
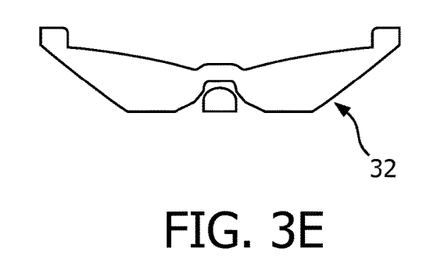
Figure 3F:
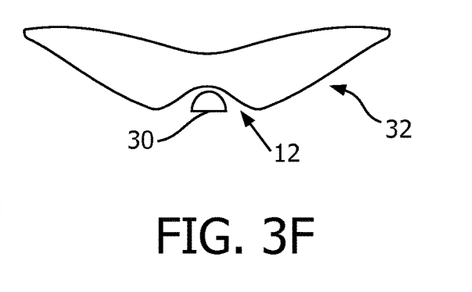
Figure 3G:
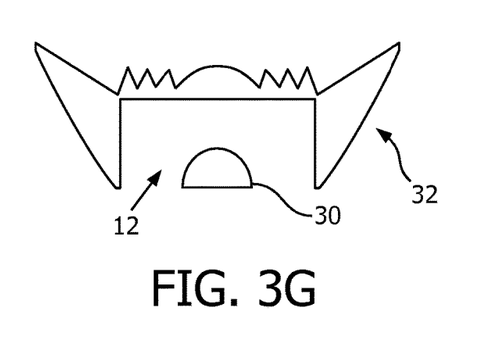

The collimator design of FIGS. 13 and 14 is based on combining two separate collimator designs. However, more individual collimator designs may be combined. Each individual design has rotational symmetry but of different diameter. If the exit surface is flat, (for example as shown in FIGS. 3A and 3C), multiple collimators may be combined while maintaining a continuous smooth exit surface.

Figure 15:
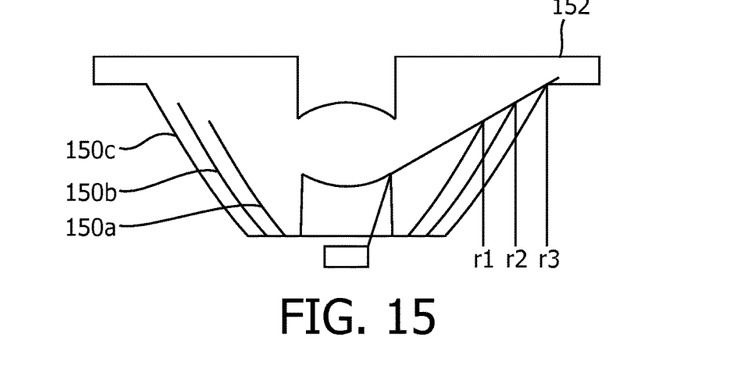
FIG. 15 shows a collimator design according to a third example.

This is shown in FIG. 15 in which three different diameter portions 150a, 150b, 150c are shown with a common flat exit surface 152. The three different radii are shown as r1, r2 and r3.

The different sectors are connected with vertical or almost vertical side walls (for example with a small draft angle for injection molding). In this context, vertical means parallel to the central optical axis. Such side walls have no adverse effect on efficiency or the light distribution.

The efficiency of the combination of sections is the same as the efficiency of the basic collimator designs used for the segments. This means that a segmented collimator can have 100% geometrical efficiency (neglecting reflection, Fresnel and absorption losses).

Figure 16:
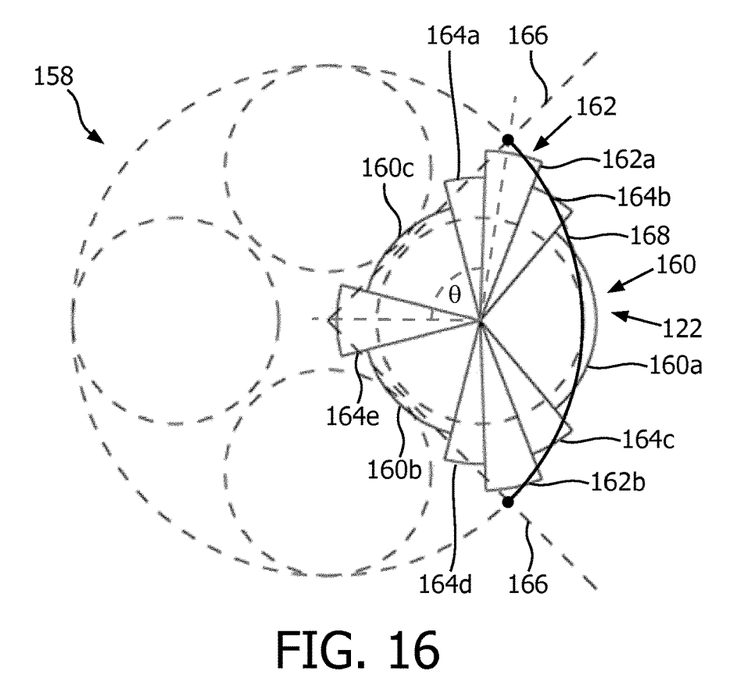
FIG. 16 shows a collimator design used in an arrangement of four collimators according to a fourth example in plan view.

FIG. 16 shows another example of design of collimator arrangement 158 using four collimators 122, one of which is shown more clearly than the others.

Each collimator 122 comprises a first smallest diameter section 160 with three sectors 160a, 160b, 160c. These are sectors of a first, smallest diameter, circular design.

A second largest diameter section 162 has two sectors 162a, 162b. The two sectors of the second section are between 90 and 105 degrees (angle θ) at each side of the radial direction towards the center of the overall design. They are sectors of a second, largest diameter, circular design.

The four collimators are in a 2×2 grid, but the overall outer shape remains generally circular rather than square. An angle of θ=100 degrees (to 3 significant figures) corresponds to the portions 160a, 162b being oriented towards points of the circular general outer shape which are 90 degrees apart. Thus, the two sectors of the second section are for example 100 degrees at each side of the radial direction. This then provides an optimum way to fill the gaps in a larger circle formed by the tessellation of four smaller circles.

Each collimator thus approximates to a 90 degree sector, with two edges 166 which approximate straight radial edges and a 90 degree arc 168 at the outside.

Each collimator may further comprise a third section, wherein the third section comprises five sectors 164a to 164e. One is on each side of the two sectors 162a, 162b of the second section, and the fifth sector 164e is directed radially inwardly. The third section comprises sectors of a third collimator lens design with third diameter between the first and second diameters. This means the desired 90 degree sector shape is approximated more closely.

FIG. 16 illustrates one specific example. However, the general approach to the design may be applied to other examples. In particular, the outer shape of the collimators is first chosen (e.g. square) or it is derived from the tessellation of collimators, for example a quarter of a circle as in FIG. 16.

At least two different diameter collimators are (conceptually) cut and arranged according to the desired radius of the outer shape of the collimator as a function of the angle θ. The sectors of different diameter are arranged to fill the full collimator. The more different diameters are chosen, the closer the outer shape can be followed.

The gaps in a larger circle, or other shape, are filled more effectively when using multiple diameter sectors.

In this design, four collimators are combined to fill a round exit aperture and to emit light from almost all of the surface. This mimics a single optic look, which is highly appreciated by marketing.

Each of the four collimators consists of three different designs (of different radius) that are combined with each other. Each of the three designs has different diameters/height. The three different designs share the same cavity, same center and the same exit surface.

Figure 17:
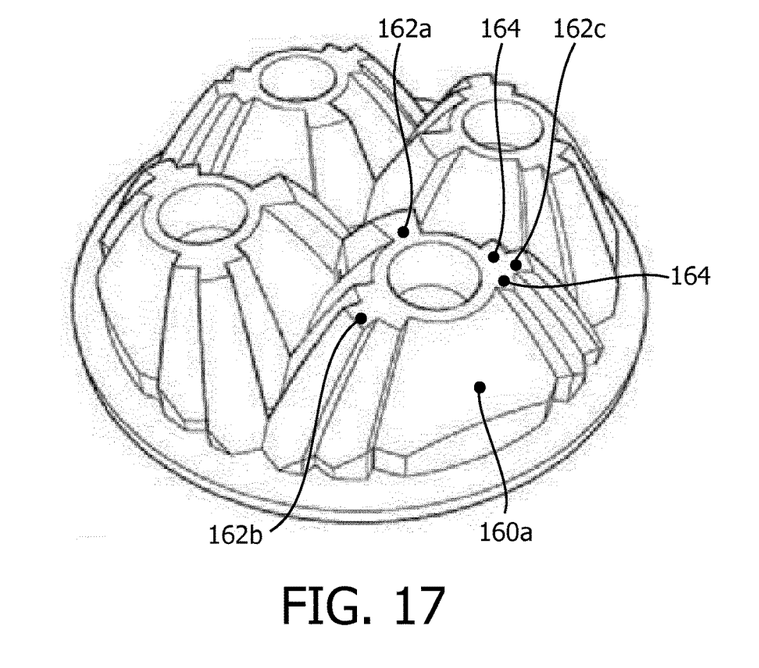
FIG. 17 shows the collimator arrangement of FIG. 16 in perspective view.

FIG. 17 shows the design of FIG. 16 in perspective view. The collimator arrangement has a flat output surface and is based on total internal reflection collimators.

The use of more sections can achieve an even better approximation of a desired square or rectangular aperture. Ray tracing modeling shows that the light distribution is still round with almost no artifacts resulting from the segmentation of the total internal reflection surface. If needed, faceting, or texture can be added in known manner for beam widening, smoothing or color mixing.

Figure 18:
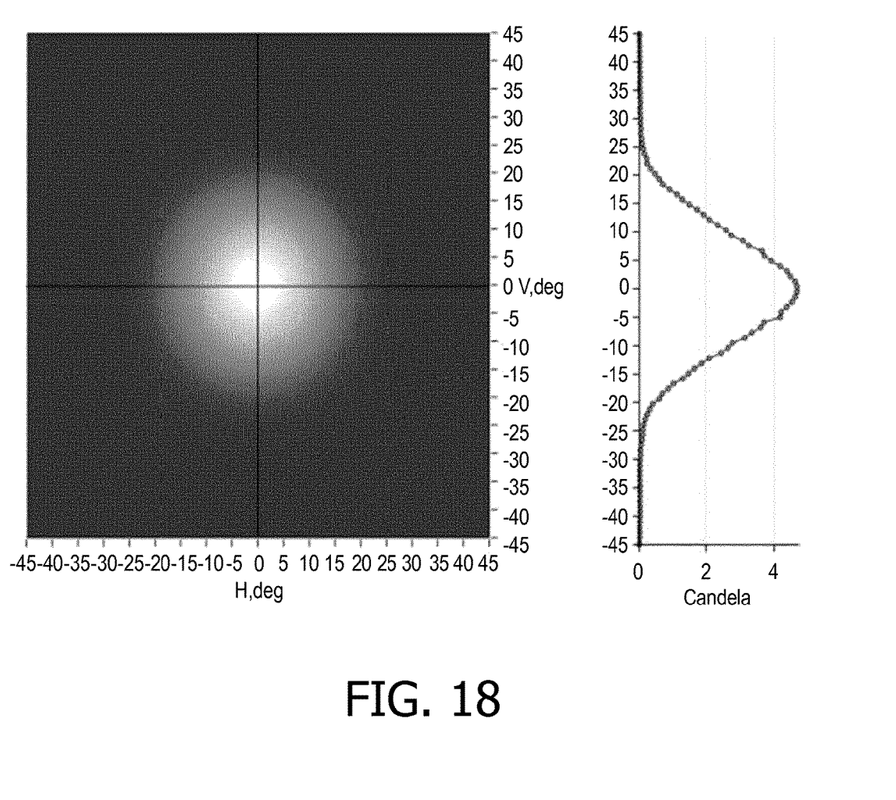
FIG. 18 shows one representation of the light output distribution for the design of FIG. 17.

FIG. 18 shows the intensity distribution of the lens of FIGS. 16 and 17 as projected onto a surface. The left part shows the intensity as an image, and the right part shows the intensity as function of angle for one cross section. There are no visible artifacts arising from the segmentation.

In some designs, the central LED cavity (for example in the designs of FIGS. 3A, 3B, 3D, 3E, 3F and 3G) can be identical in all sections and only one or two of the remaining optical surfaces need to vary between segments. However, it is also possible to provide designs where all surfaces in one section are discontinuous from the corresponding surfaces of the neighboring section.

Figure 4A:
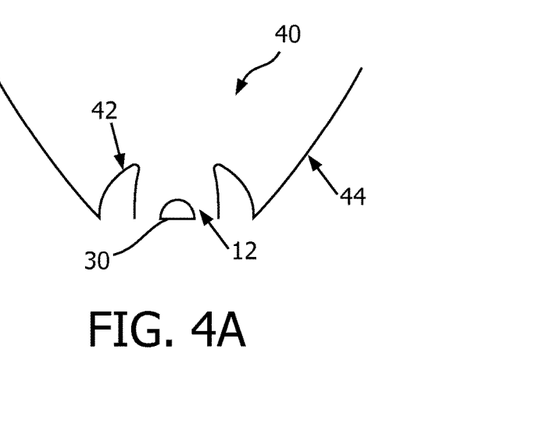
FIG. 4A-E shows a second set of example of known collimator design making use of specular reflection.
Figure 4B:
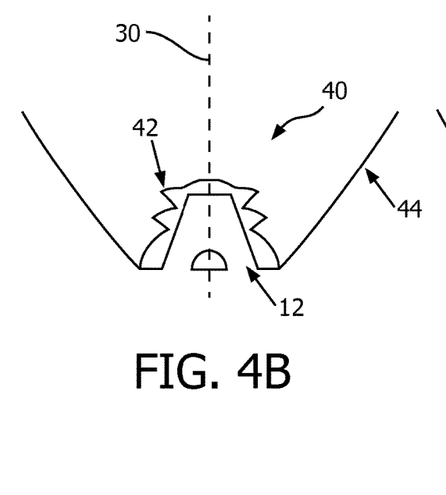
Figure 4C:
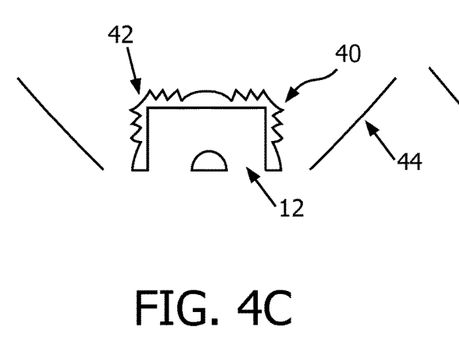
Figure 4D:
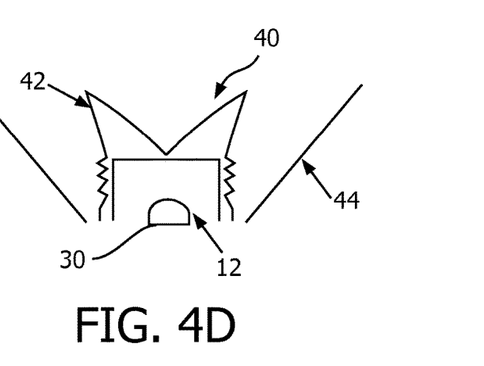
Figure 4E:
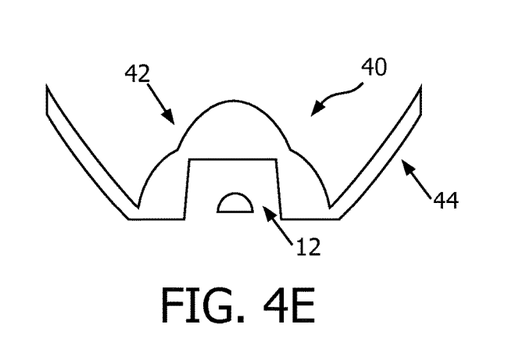

In the case of side emitting primary lenses as shown in FIGS. 4A and 4E, the side emitting lenses can be the same between segments, and only the radially outer reflector part 42 needs to be radially segmented to provide different diameters for each segment.

The cut-outs or the segments in the different examples above preferably have specular reflective sidewalls or edges. Designs based on total internal reflection automatically define reflecting sidewalls, but other designs may be provided with reflecting sidewall coatings to confine the light to a respective region.

Thus, there are various different ways to implement the combination of collimator designs into a single collimator.

The manufacture of the collimator will be routine to those skilled in the art. By way of example, the design may be injection molded from a transparent plastics material.

Each collimator for example has a diameter in the range 5 mm to 25 mm. By suitable choice of the size of the individual collimators and the number used (for example as shown in FIGS. 6 to 9) the overall size may be selected. The largest dimension of the overall size is for example in the range 5 mm (for a single collimator such as in FIG. 13) to 100 mm, although larger sizes are possible. The use of multiple collimators for individual light sources enables the height to be kept to a minimum, for example to less than 25 mm and preferably less than 10 mm. In general the height may be kept to less than half or preferably one third of the diameter of each collimator.

Two different approaches to enable better tessellation are outlined above. However, they share the same conceptual approach. In all designs, each individual collimator comprises one or more segments of a circular collimator, which are interrupted by pairs of inwardly extending sidewalls in a plane essentially parallel to the optical axis (although possible with a slight slant angle to release products from an injection mold). These sidewalls extend fully within the general outer circular shape thereby reducing the area of the collimator to form an interrupted zone. The side walls meet at an internal angle of less than 180 degrees, for example 90 degrees or less. The internal angle may be at the center of the circle or it may be offset so that the central portion of the collimator is retained.

Thus, the invention also provides a collimator comprising: a light entrance opening having an optical axis (which is a central axis); and a collimating optical structure disposed around the optical axis, wherein the collimating optical structure comprises one or more segments of a circular collimator design, which segment or segments are each interrupted by a pair of inwardly extending sidewalls in a plane parallel to the optical axis, wherein the sidewalls extend fully within the general outer circular shape thereby forming an interrupted zone, and wherein the side walls meet at an internal angle of less than 180 degrees.

In a collimator arrangement, the interrupted zone is filled either by tessellation with another collimator or it is filled by another portion of the collimator itself, but which is part of a different circularly symmetric collimator design. In this way, the interrupted zone is either a cut out so that at least partial tessellation becomes possible to fill that zone, or else it is filled with a sector of a different collimator design, so that the outer shape is adapted to become non-circular. Thus, in one set of designs, the interrupted zone forms a recess, and in another set of designs it is filled with another design so as to form a radial projection. In all cases, the resulting outer shape is more easily tessellated, although a single collimator of the design may be used by itself.

The invention is of interest for general spot lamps (such as MR 16, GU10, AR111), retail lighting, parabolic aluminized reflector (PAR) lamps, and professional spot lights.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A collimator arrangement comprising a plurality of collimators, each collimator having in a respective exit window a circular general outer shape with one or more cut-outs into the circular general outer shape, wherein each cut-out comprises a pair of edges which meet at an internal angle and each cut-out defines a pair of external angles where the cut-out meets the general outer shape, wherein each respective collimator is interlocked with at least one adjacent collimator to form a tessellation with the internal angle of one of the one or more cut-outs of the respective collimator being interlocked with one of the exterior angles of the at least one adjacent collimator.

2. An arrangement as claimed in claim 1, wherein each cut-out defines an internal angle of 80 to 100 degrees.

3. An arrangement as claimed in claim 1, wherein each collimator comprises a center part, and an outer reflector part, wherein the cut-outs of each collimator are formed in the reflector part.

4. An arrangement as claimed in claim 1, wherein each collimator comprises a total internal reflection collimator.

5. An arrangement as claimed in claim 1, wherein each collimator has an entrance opening for receiving light from a respective light source, wherein the entrance opening of each collimator has a portion for directing the light away from a region of the collimator including the one or more cut-outs.

6. An arrangement as claimed in claim 1, comprising:
four collimators each with a single cut-out and one collimator with four cut-outs; or
four collimators each with two cut-outs; or
two collimators each with four cut-outs, four collimators each with two cut-outs and two collimators each with one cut-out; or
four collimators each with four cut-outs and eight collimators each with two cut-outs.

7. A lighting unit comprising:
a collimator arrangement as claimed in claim 1 and
a respective light source configured to couple light into a light input into each of the collimators.

* * * * *